United States Patent [19]
Lee et al.

[11] Patent Number: 5,895,608
[45] Date of Patent: Apr. 20, 1999

[54] DOWNCOMER FOR CHEMICAL PROCESS TOWER AND METHOD OF FORMING THE SAME

[75] Inventors: Adam T. Lee, Richardson; Kuang Wu, Plano; Larry Burton, De Soto, all of Tex.

[73] Assignee: Koch Enterprises, Inc., Wichita, Kans.

[21] Appl. No.: 08/742,819

[22] Filed: Oct. 30, 1996

[51] Int. Cl.$^6$ ........................................... B01F 3/04
[52] U.S. Cl. ........................... 261/114.1; 261/114.5
[58] Field of Search ................ 261/114.1, 114.5, 261/114.4

[56] References Cited

U.S. PATENT DOCUMENTS

| | | |
|---|---|---|
| 1,605,264 | 11/1926 | Millard . |
| 2,420,075 | 5/1947 | Glitsch .......................... 261/114.1 |
| 2,582,826 | 1/1952 | Glitsch .............................. 189/34 |
| 2,591,343 | 4/1952 | Eld ................................. 261/113 |
| 2,607,663 | 8/1952 | Perry et al. ......................... 23/288 |
| 2,611,596 | 9/1952 | Glitsch ............................ 261/114 |
| 2,693,949 | 11/1954 | Huggins ........................... 261/114 |
| 2,757,915 | 8/1956 | Huggins ........................... 261/114 |

(List continued on next page.)

FOREIGN PATENT DOCUMENTS

| | | |
|---|---|---|
| 510247 | 5/1976 | U.S.S.R. . |
| 546356 | 3/1977 | U.S.S.R. . |
| 8000418 | 3/1980 | WIPO .......................... 261/114.1 |

OTHER PUBLICATIONS

"Linde Multiple Downcomer Trays," Product Brochure, Union Carbide Corp., P.O. Box 44, Tonawanda, N.Y. 14150, Nov. 1969.

"Packed Column Internals," Chen, Gilbert, *Chemical Engineering*, pp. 40–51, Mar. 5, 1984.

*Ballast Tray Design Manual*, Glitsch, Inc., Bulletin No. 4900–Fourth Edition, 1974.

"Diversity Process Strategies for Reformulated Gasoline," Nocca, Jean Luc et al., *Hart's Fuel Reformulation*, vol. 4, No. 5, Sep./Oct. 1994.

*Primary Examiner*—Richard L. Chiesa
*Attorney, Agent, or Firm*—Shook, Hardy & Bacon L.L.P.

[57] ABSTRACT

A chemical process tower tray construction incorporating a tapered semi-conical downcomer adaptive for discharging liquid along an arcuate edge portion of an underlying tray. The underlying tray is of the type supported within the chemical process tower by a support ring which is positioned beneath the edge of the tray for the support thereof. The solid support ring typically forms a nonactive area beneath this region of the tray and the tapered downcomer discharges liquid directly onto the inactive region wherein the remaining portion of the tray can be utilized for mass transfer.

26 Claims, 5 Drawing Sheets

U.S. PATENT DOCUMENTS

| | | | |
|---|---|---|---|
| 2,787,453 | 4/1957 | Hibshman et al. | 261/114 |
| 2,840,182 | 6/1958 | Coulter et al. | 183/26 |
| 2,973,189 | 2/1961 | Chu | 261/114.1 |
| 3,008,553 | 11/1961 | Glitsch et al. | 189/36 |
| 3,013,782 | 12/1961 | Glitsch | 261/114 |
| 3,045,989 | 7/1962 | Kittel | 261/114.1 |
| 3,214,247 | 10/1965 | Broughton | 23/288 |
| 3,282,576 | 11/1966 | Bruckert et al. | 261/114 |
| 3,410,540 | 11/1968 | Bruckert | 261/113 |
| 3,550,916 | 12/1970 | Hoppe et al. | 261/114 |
| 3,700,216 | 10/1972 | Vitti et al. | 261/114.1 |
| 3,784,175 | 1/1974 | Hirao et al. | 261/114 R |
| 3,887,665 | 6/1975 | Mix et al. | 261/114 R |
| 3,959,419 | 5/1976 | Kitterman | 261/98 |
| 3,969,447 | 7/1976 | Glitsch et al. | 261/111 |
| 4,101,610 | 7/1978 | Kirkpatrick et al. | 261/110 |
| 4,105,723 | 8/1978 | Mix | 261/105 |
| 4,132,761 | 1/1979 | Mix | 423/242 |
| 4,133,852 | 1/1979 | DiNicolantonio et al. | 261/114 TC |
| 4,174,363 | 11/1979 | Bruckert | 261/114 TC |
| 4,442,048 | 4/1984 | Abernathy et al. | 261/114.1 |
| 4,499,035 | 2/1985 | Kirkpatrick et al. | 261/114 JP |
| 4,504,426 | 3/1985 | Chuang et al. | 261/114 R |
| 4,547,326 | 10/1985 | Weiler | 261/114.1 |
| 4,623,493 | 11/1986 | Bentham | 261/109 |
| 4,627,941 | 12/1986 | Bentham | 261/109 |
| 4,950,430 | 8/1990 | Chen et al. | 261/112.2 |
| 4,956,127 | 9/1990 | Binkley et al. | 261/114.1 |
| 5,047,179 | 9/1991 | Nye | 261/114.1 |
| 5,049,319 | 9/1991 | Nye | 261/114.1 |
| 5,098,615 | 3/1992 | Resetarits | 261/114.1 |
| 5,106,556 | 4/1992 | Binkley et al. | 261/114.1 |
| 5,108,550 | 4/1992 | Pinaire et al. | 203/1 |
| 5,120,474 | 6/1992 | Binkley et al. | 261/114.4 |
| 5,147,584 | 9/1992 | Binkley et al. | 261/114.3 |
| 5,164,125 | 11/1992 | Binkley et al. | 261/114.1 |
| 5,192,466 | 3/1993 | Binkley | 261/114.3 |
| 5,244,604 | 9/1993 | Miller et al. | 261/97 |
| 5,277,847 | 1/1994 | Gentry et al. | 261/114.1 |
| 5,277,848 | 1/1994 | Binkley et al. | 261/114.1 |
| 5,366,666 | 11/1994 | Chuang et al. | 261/97 |
| 5,389,343 | 2/1995 | Gentry | 422/191 |
| 5,453,222 | 9/1995 | Lee et al. | 261/114.1 |
| 5,547,617 | 8/1996 | Lee et al. | 261/114.5 |
| 5,618,473 | 4/1997 | Sauter et al. | 261/114.1 |

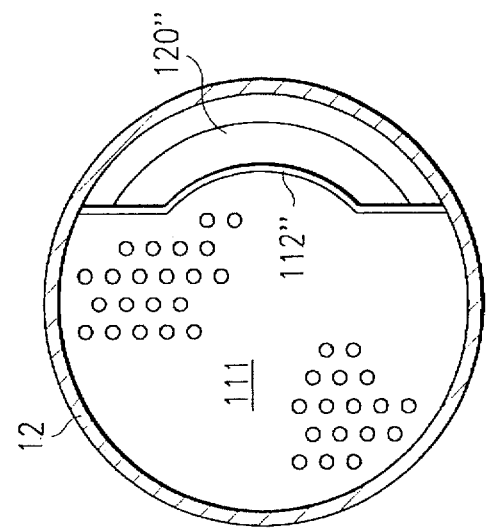
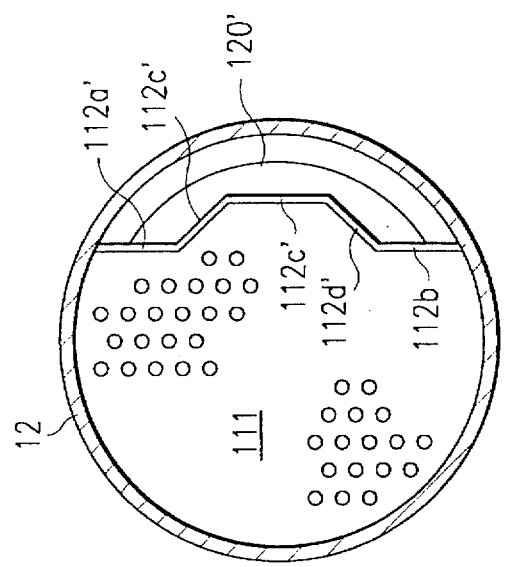
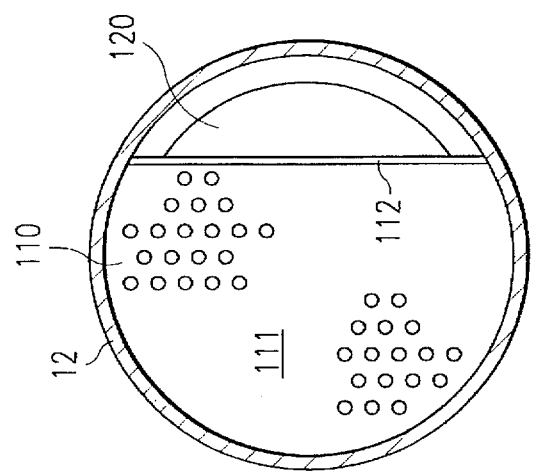
FIG. 5C
FIG. 5B
FIG. 5A

DOWNCOMER FOR CHEMICAL PROCESS TOWER AND METHOD OF FORMING THE SAME

BACKGROUND

1. Field of the Invention

The present invention relates to chemical process towers and, more particularly, but not by way of limitation, to a tapered downcomer assembly for maximizing mass transfer performance across an adjacent tray.

2. History of Related Art

Distillation columns are utilized to separate selected components from a multi component stream. Successful fractionation in the column is dependent upon intimate contact between liquid and vapor phases. Some columns use vapor and liquid contact devices such as trays.

The above-referenced trays are generally installed on support rings within the tower and have a solid tray or deck with a plurality of apertures in an "active" area. Liquid is directed onto the tray by means of a vertical channel from the tray above. This channel is referred to as the downcomer. The liquid moves across the active area and exits through a similar downcomer. The location of the downcomers determine the flow pattern of the liquid. Vapor ascends through the apertures in the trays and contacts the liquid moving across the tray. The liquid and vapor mix in the active area and fractionation occurs. It is the active area of the tray that is of critical concern.

The maximum fractionation capacity of the tray generally increases with an increase in the active or bubbling area. Maximum utilization of active area of a tray is an important consideration to chemical process tower design. Regions of the tray which are not effectively used for vapor-liquid contact can reduce the fractionation capacity and efficiency of the tray. Therefore, there is a need for devices and methods that optimize the active design area design of a fractionation tray in a chemical process tower.

It is well known that the concentration-difference between the vapor and the liquid is the driving force to effect mass transfer. Said concentration-difference can be effected in many ways; some reducing fractionation efficiency. When operating pressure is such as to produce a vapor density above about 1.0 lbs/cu. ft., there is the possibility that some amount of vapor bubbles are commingled or entrained with the downcomer incoming liquid. For example, as operating pressure increases due to an increase in the vapor concentration, descending liquid begins to absorb vapor as it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released, otherwise the downcomer can not accommodate the liquid/vapor mixture and will flood thus preventing successful tower operation.

Similarly, an exothermic reaction in the downcomer will generate vapors from the equilibrium mixture, which also will be released. For conventional trays, the released vapor will oppose the descending frothy vapor/liquid mixture flowing into the downcomer. In many cases, such opposition leads to poor tower operation and premature flooding. Therefore, there is a need for devices and methods that facilitate the release of vapor entrained in the liquid within a downcomer of a chemical process tower.

Another serious problem which manifests itself in such operational applications is entrainment of liquid droplets in the ascending vapor. This phenomenon, which is virtually the opposite of the above vapor entrainment, can prevent effective vapor liquid contact. Liquid entrainment is, in one sense, a dynamic flow condition. High velocity vapor flow can suspend descending liquid droplets and prevent their effective passage through the underlying froth mixture zone. It is particularly difficult to prevent this problem when the tower applications require high volume vapor flow in a direction virtually opposite to that of high volume, descending liquid flow. Therefore, there is a need for devices and methods that will reduce the liquid entrained in the vapor within a chemical process tower.

Efficiency of a tray is also reduced when vapor ascending through the process column is allowed to by-pass the active area of a tray. One area where vapor can by-pass the active area of a tray is the downcomer. When vapor intended for the active area of the tray unintentionally passes through the downcomer the efficiency of the active area in the tray is reduced. Also, vapor unintentionally passing through the downcomer will reduce the flow of liquid through the downcomer and potentially cause a backup of the liquid flowing through the process column. Therefore, there is a need for devices and methods that reduce the amount of vapor that flows through a downcomer.

Efficiency of the active area in a tray is also influenced by the flow of liquid across the active area. At the initial point of contact of liquid from a downcomer onto the tray, the flow of the liquid is not typically a flow characteristic that provides optimum efficiency for the active area of a tray. Therefore, there is a need for devices and methods that assist in the change of flow characteristics of fluid from a downcomer on to the active area of a tray. The present invention provides such a method and apparatus for maximizing mass transfer efficiency in chemical process towers.

SUMMARY

The present invention relates to the chemical process tower downcomer tray configuration. More particularly, one aspect of the present invention comprises a tapered downcomer disposed above a chemical process tower tray. The tray is supported by a support ring and the downcomer is tapered for discharging liquid directly upon the region of the tray directly above the support ring. A generally arcuately shaped weir is provided upon the tray in the region of the periphery of the support ring for defining the tray inlet area and controlling the liquid discharge therefrom onto the tray.

In another aspect, the present invention includes a tower, a downcomer, and a tray. The tower has at least one tray support. The downcomer has an outlet for the flow of liquid therefrom and is positioned within the tower above the tray support. The tray is supported on the tray support within the tower and below the downcomer. The tray has a tray support region located above the tray support ring of the tower. The tray also has a tray inlet area located in an area for receiving liquid from the outlet of the downcomer. The tray support of the tower and the outlet of the downcomer are positioned such that the tray inlet area of the tray is substantially within the tray support area of the tray.

In another embodiment, the present invention comprises an improved method of mixing a gas with a liquid from a downcomer in a process tower using a tray, the improvement comprising the steps of supporting the tray in the process column with a tray support located below a tray support area, and positioning the downcomer such that liquid from the downcomer flows onto a tray inlet area of the tray that is substantially within the tray support region of the tray.

In another embodiment, the present invention comprises a process column comprising a tower, a downcomer positioned within the tower and having an outlet for the flow of liquid therefrom, and a tray positioned within the tower below the downcomer. The tray includes an inlet weir that encompasses the downcomer inlet region where fluid from the outlet of the downcomer contacts the tray.

In another embodiment, the present invention comprises an improved tray assembly for use in a process column of the type where liquid from a downcomer passes onto the tray for engagement with a gas ascending through the column, the improvement comprising an inlet weir encompassing a downcomer inlet area of the tray where liquid from said downcomer contacts the tray.

BRIEF DESCRIPTION OF THE DRAWINGS

For a more complete understanding of the present invention and for further objects and advantages thereof, reference may now be had to the following description taken in conjunction with the accompanying drawings in which:

FIG. 5A is an enlarged, fragmentary top view of one embodiment of the downcomer tray assembly of FIGS. 2 and 3;

FIG. 5B is an enlarged, fragmentary top view of another embodiment of the downcomer-tray assembly of FIGS. 2 and 3; and FIG. 5C is an enlarged, fragmentary top view of another embodiment of the downcomer-tray assembly of FIGS. 2 and 3.

DETAILED DESCRIPTION

Figure 1:
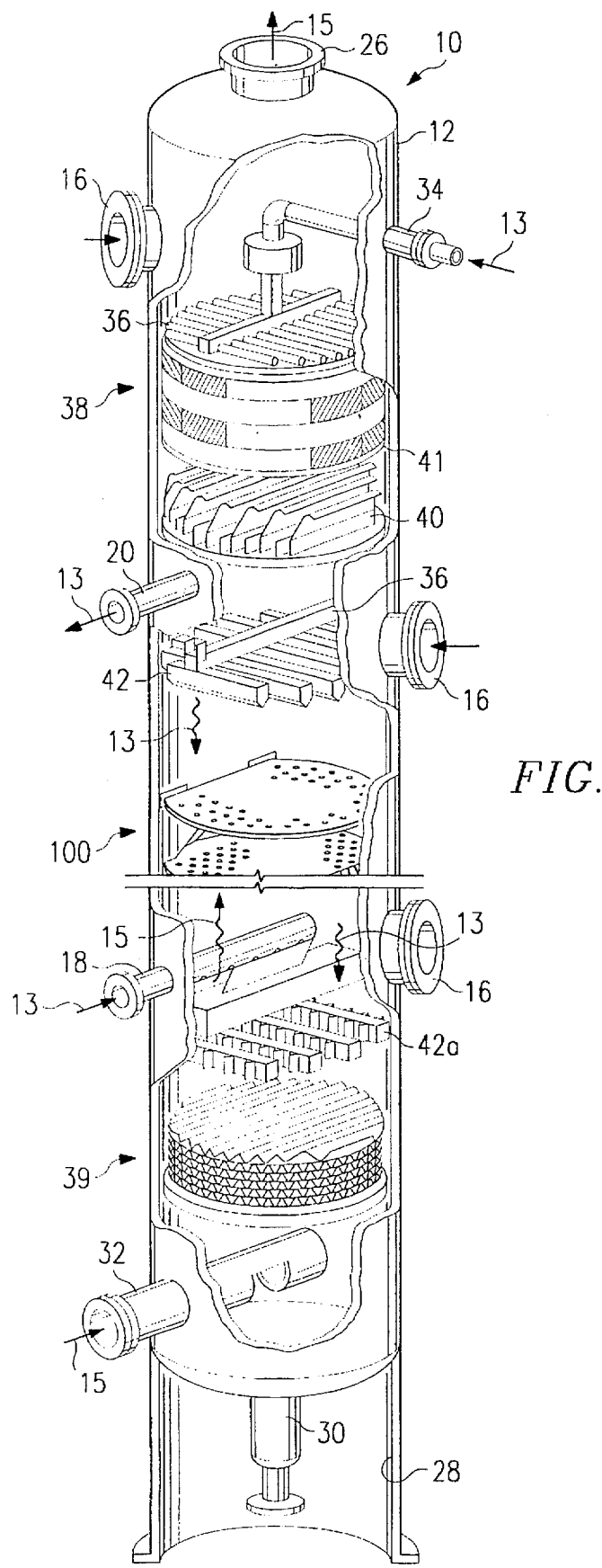
FIG. 1 is a perspective view of a packed column with various sections cut away for illustrating a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved downcomer-tray assembly of the present invention. The exchange column 10 of FIG. 1 comprises a cylindrical tower 12 having packing beds 38 and 39, and a downcomer tray assembly 100 incorporating the principles of the present invention disposed therein. The tower 12 of the column 10 includes a skirt 28 for the support of the tower 12. A plurality of manways 16 are constructed for facilitating access to the internal region of the tower 12. A stream vapor feed line or reboiler return line 32 is provided in a lower portion of the tower 12 and a vapor outlet or overhead line 26 is provided in an upper portion of the tower 12. A reflux return line 34 is provided in an upper portion of the tower 12 and a bottom stream draw off line 30 is provided at the bottom of the tower 12. Also provided are a side stream draw off line 20 and a liquid side feed line 18 in the tower 12.

Referring still to FIG. 1, in operation, vapor 15 is fed into the tower 12 through the return line 32 and liquid 13 is fed into the tower 12 through the reflux return line 34 and the side stream feed input feed line 18. The vapor 15 flows upwardly through the column 10 and ultimately leaves the tower 12 through the vapor outlet 26. The liquid 13 flows downwardly through the column 10 and ultimately leaves the tower 12 either at the side stream draw off 20, or at the bottom stream draw off line 30. In its downward flow, the liquid 13 is depleted of some material which is gained by the vapor 15 as they pass through the tray assembly 100 and the packing beds 38, 39 of the column 10, and the vapor 15 is depleted of some material which is gained by the liquid 13.

Referring still to FIG. 1, it may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath. A second type of distributor 42a is shown below the cut-line and disposed above the lower packing bed 39. The internal arrangement of the column 10 is diagrammatical only and is provided for referencing various component arrays therein.

Figure 2:
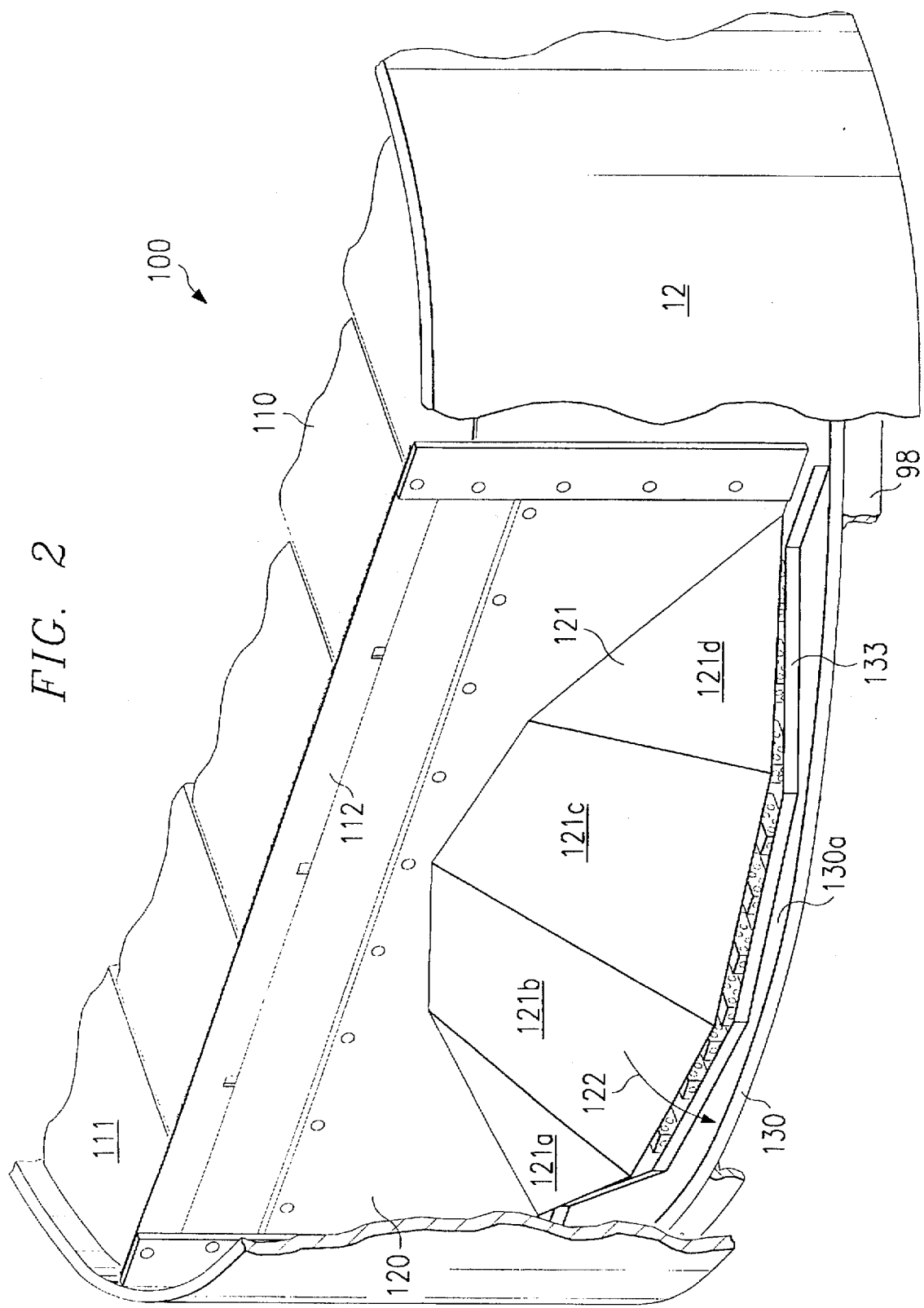
FIG. 2 is an enlarged, fragmentary, perspective view of the downcomer-tray assembly in FIG. 1, with portions of the tower cut away and illustrating the construction of the downcomer and tray of the present invention.
Figure 3:
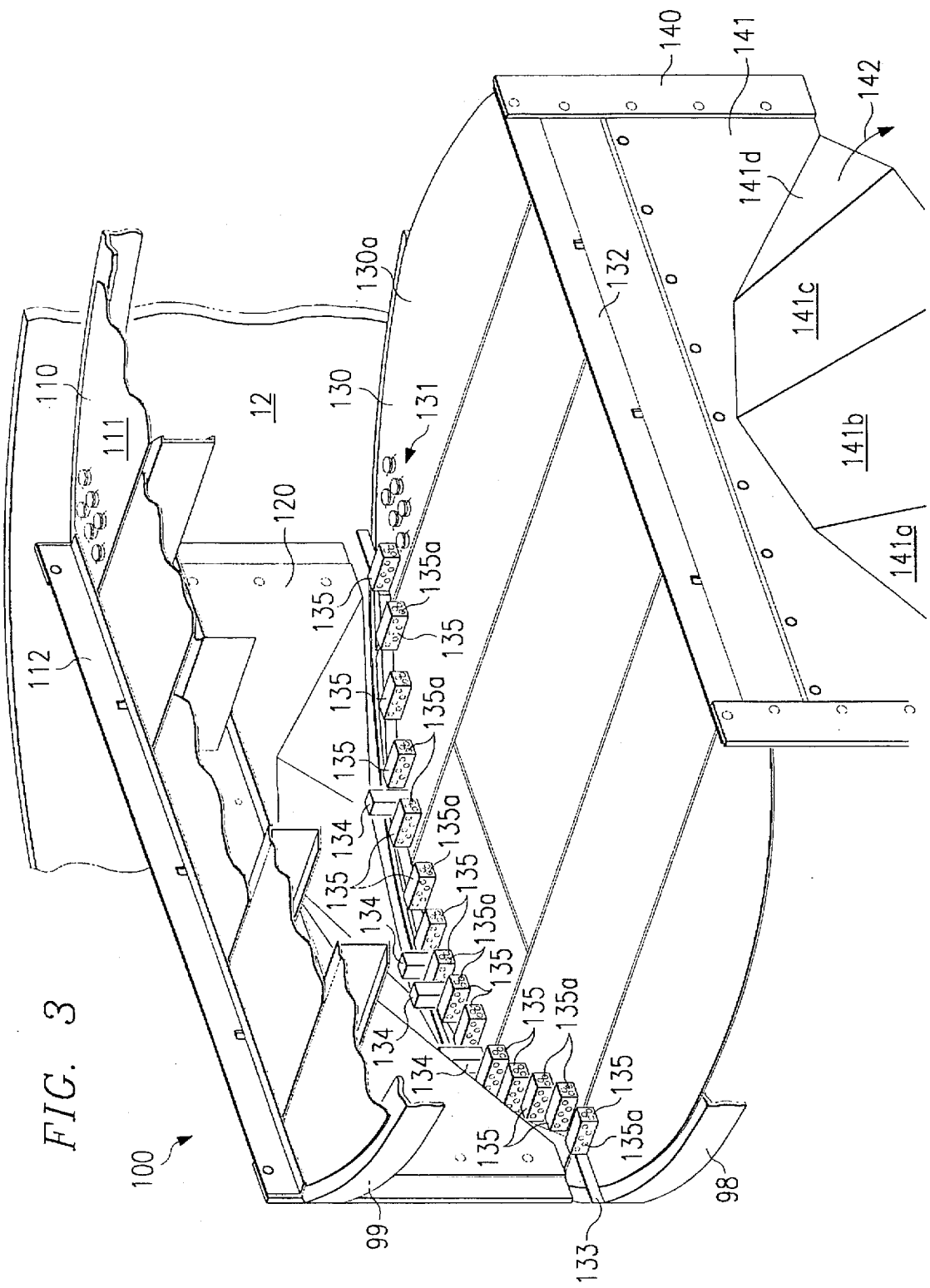
FIG. 3 is an enlarged, fragmentary, perspective view of the downcomer tray assembly of FIG. 2, taken from the inside of the tower.

Referring now to FIGS. 2 and 3, there are shown two fragmentary perspective views of the downcomer-tray assembly 100 in FIG. 1 taken from opposite angles relative to the tower 12. In this embodiment, the downcomer tray assembly 100 includes a first tray 110 connected to a first downcomer 120, and a second tray 130 connected to a second downcomer 140. The trays 110 and 130 are generally planar panels that have central active areas 111 and 131, respectively. The trays 110 and 130 are supported by support rings 98 and 99, respectively, of the tower 12. Outlet weirs 112 and 132 are disposed of on the first and second trays 110 and 130, respectively, adjacent to the downcomers 120 and 140, respectively. The outlet weirs 112 and 132 are preferably an upright plate or strip welded to the planar panels of the trays 120 and 140.

Still referring to FIGS. 2 and 3, the downcomers 120 and 140 have semi-conical walls 121 and 141, respectively, that taper from the outlet weirs 112 and 132 of the trays 110 and 130, downwardly towards the inner surface of the tower 12. The walls 121 and 141 of the downcomers 120 and 140 are preferably formed from flat plates 121a–d and 141a–d, respectively, that are welded together in a configuration shown herein. The actual construction of the downcomer may vary in accordance with the principles of the present invention. For example, the segmented-angled construction of the downcomer side walls may be modified with more downcomer sections or with fewer downcomer sections and an arcuate or curved construction. Downcomer outlets 122 and 142 are formed between the bottom of the walls 121 and 141 and the inner surface of the tower 12. In one embodiment, the downcomer outlets 122 and 142 are positioned directly above the tray support rings 98 and 99 of the tower 12 and have an opening area that is contained substantially within the area directly above the tray support rings 98 and 99.

Referring still to FIGS. 2 and 3, the tray 130 has an inlet weir 133 positioned around the area directly below the downcomer outlet 122. The inlet weir 133 is preferably an upright plate or strip welded to the planar panel of the tray 130. In one embodiment, the inlet weir 133 has a vertical height that extends above the position of the downcomer outlet 122. The lower portion of the downcomer 120 is supported by clips 134 that are welded to the inlet weir 133 and bolted to the lower portion of the downcomer 130.

Still referring to FIGS. 2 and 3, the tray 130 includes a plurality of venting chambers 135 that are disposed in the area of the tray 130 located on the opposite side of the inlet weir 133 from the downcomer outlet 122. The venting chambers 135 have a plurality of apertures 135a for using the vapor 15 to impart a horizontal flow to the liquid 13 spilling over the inlet weir 133.

Figure 4:
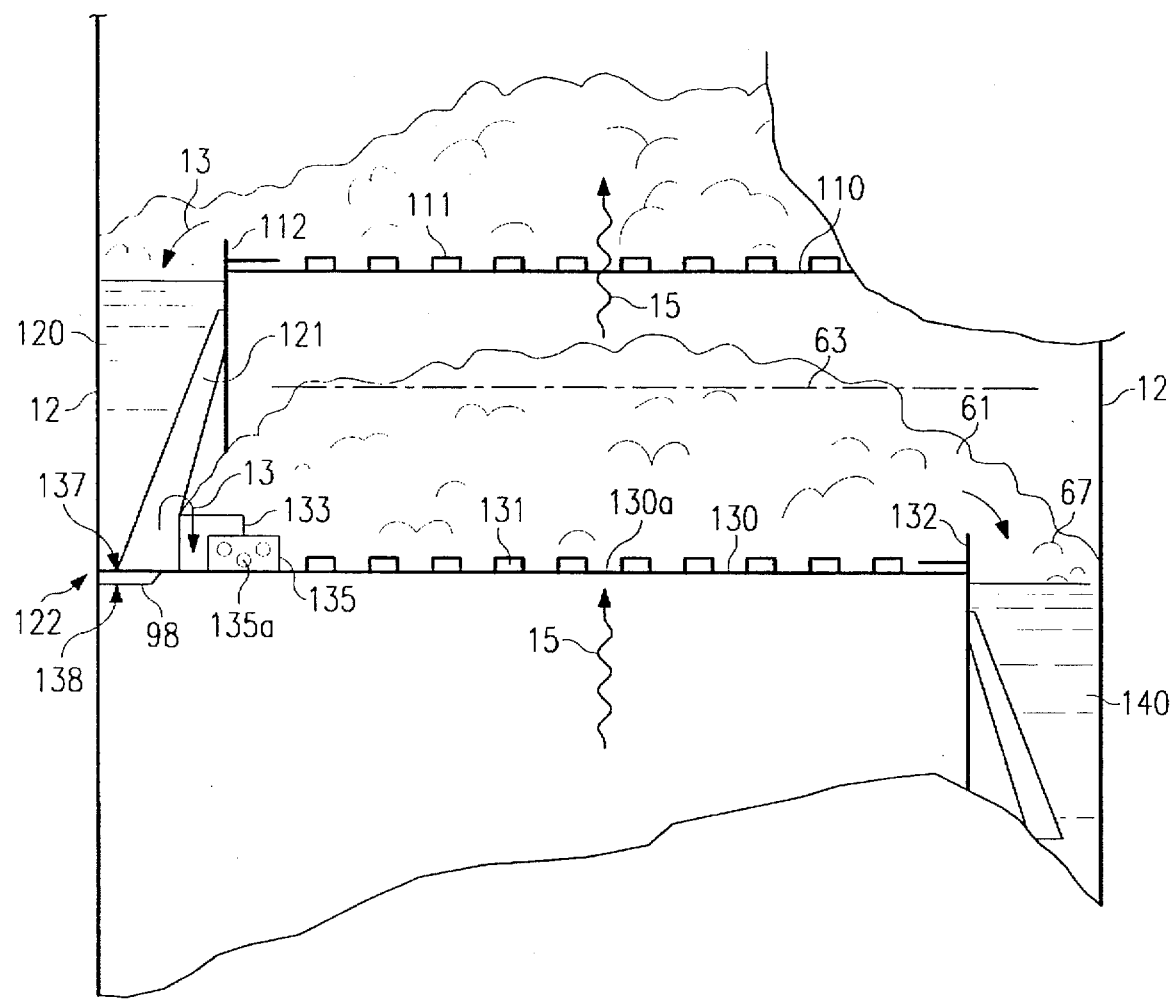
FIG. 4 is a diagrammatic, side-elevational, cross-sectional view of the downcomer-tray assembly of FIGS. 2 and 3 illustrating the principles of operation thereof.

Referring now to FIG. 4, liquid 13 crossing the active area 111 of the tray 110 engages vapor 15 ascending through the active area 111. The outlet weir 112 controls the flow of liquid 13 that passes from the active area 111 of the tray 110 into the downcomer 120. Liquid 13 flowing over the outlet weir 112 of the tray 110 passes downwardly between wall 121 of the downcomer 120 and the inner wall of the tower 12. The liquid 13 exits the downcomer 120 through the outlet 122 and accumulates on the tray 130 in an area between the inlet weir 133 and the inner wall of the tower 12.

Still referring to FIG. 4, once the level of liquid 13 accumulating in the area of the tray 130 between inner wall of the tower 12 and the inlet weir 133 reaches the height of the inlet weir 133, additional liquid 13 exiting the downcomer outlet 122 will cause liquid 13 to pass or spill over the inlet weir 133. Some of the vapor 15 passing upward in the column 10 flows through the apertures 135a in the vent chambers 135 and engages the liquid 13 spilling over the inlet weir 133. The vapor 15 from the venting chambers 135 imparts a horizontal flow vector to the liquid 13 spilling over the inlet weir 133 across the active area 131 of the tray 130. The liquid 13 passing over the active area 131 of the tray 130 engages vapor 15 ascending through the active area 131.

Referring still to FIG. 4, the engagement of the liquid 13 passing across the active area 131 of the tray 130 with the vapor 15 ascending through the active area 131 creates the froth 61. As previously stated, the froth or "foam" is a region of aeration in which the phase of the liquid 13 is continuous. The froth 61 extends with a relatively uniform height, shown in phantom by line 63, across the active area 131 of the tray 130. The length of the active area 131 of the tray 130 is governed by the distance between the inlet weir 133 and the outlet weir 132. The outlet weir 132 also controls the flow of froth 61 or liquid 13 that passes from the active area 131 of the tray 130 into the downcomer 140, where the fluid exits the tray 130 for the next process in the column 10.

Referring now to FIG. 5A, there is shown a top view of the tray 110 and downcomer 120 illustrated in FIGS. 2, 3, and 4. The downcomer 120 is separated from the active area 111 of the tray 110 by the outlet weir 112. In the embodiment illustrated in FIG. 5A, the downcomer 120 is a cordal downcomer characterized by the linear outlet weir 112 of the tray 110 defining the edge of the tray 110 in a chordal manner.

Referring now to FIG. 5B, there is illustrated a top view of another embodiment of the tray 110 and downcomer 120 from FIGS. 2, 3, and 4. In the embodiment illustrated in FIG. 5B, the downcomer 120' is a swept downcomer (or multi-chordal downcomer) and is characterized by the outlet weir 112' having many segments. The outlet weir 112' has first and second segments 112a' and 112b' that are positioned in a co-linear chordal fashion. A third section 112c' is parallel to the first and second sections 112a' and 112b', but is disposed centered between the first and second sections 112a' and 112b', and offset towards the tower 12. Fourth and fifth sections 112d' and 112e' of the outlet weir 112' connect the third section 112c' with the first section 112a' and the second section 112b', respectively.

Referring now to FIG. 5C, there is shown a top view of yet another embodiment of the tray 110 and downcomer 120 illustrated in FIGS. 2, 3, and 4. In the embodiment illustrated in FIG. 5C, the downcomer 120 is defined by the outlet weir 112". The outlet weir 112" is characterized by arcuate section that is semi-circular extending towards the downcomer 120.

Referring now to FIGS. 2, 3, 4, and 5A–C in combination, the downcomer outlet 122 is narrower than the upper region of the downcomer 120, causing a build up in the region of the downcomer outlet 122 of liquid 13 flowing through the downcomer 120. The build up of liquid 13 in the region of the downcomer outlet 122 causes a dynamic seal that prevents vapor 15 ascending through the column 10 from passing through the downcomer 120 instead of the tray 110. A seal is also created by relative vertical heights of the outlet 122 for the downcomer 120 and the inlet weir 133 of the tray 130. A pool of liquid 13 from the downcomer 120 is created between the inlet weir 133 and the inner wall of the tower 12. When the vertical height of the outlet 122 for the downcomer 120 is located near or below the vertical height of the inlet weir 133 for the tray 130, outlet 122 will be immersed in the pool of liquid accumulated between the inlet weir 133 and the inner surface of the tower 12. Because the outlet 122 of the downcomer 120 is at or below the level of a pool of liquid accumulated between the inlet weir 133 of the tray 130 and the inner surface of the tower 12, vapor 15 ascending through the column 10 will be inhibited from flowing through the downcomer 120 and by-passing the tray 110.

Still referring to FIGS. 2, 3, 4, and 5A–C, the tray 130 has a support ring region 137 on a top side 130a of the tray 130 directly above the location where the support ring 98 engages the tray 130. Due to structural constraints, support ring region 137 of conventional support rings cannot ordinarily be used as an active area for the mixing of liquid 13 and vapor 15. (This aspect is addressed in U.S. Pat. No. 5,547,617 assigned to the assignee of the present invention.) The tray 130 also has a tray inlet area 138 located at the position on the top side 130a of the tray 130 where liquid 13 from the downcomer outlet 122 first contacts the tray 130. Due to the flow of liquid 13 from the downcomer outlet 122, the tray inlet area 138 of the tray 130 cannot readily be used as an active area for the mixing of liquid 13 and vapor 15. Because the downcomer outlet 122 has an area contained above the tray support ring 98, the tray inlet area 138 is substantially within the support ring region 137 of the tray 130. By consolidating the tray inlet area 138 of the tray 130 substantially within the support ring region 137, the area of the tray 130 available for use as the active area 131 is increased over conventional tray assemblies that either do not position the tray inlet area substantially within the support ring region of the tray 130 or otherwise address this issue.

Referring still to FIGS. 2, 3, 4, and 5A–C, because the support ring 98 is a narrow band around the inner circumference of the tower 12, the support ring region 137 of the tray 130 will be a long narrow region. In order for the tray inlet area 138 to be substantially within the support ring region 137, the downcomer outlet 122 will usually need to be longer than conventional downcomers to accommodate the liquid 13 flowing through the downcomer 120. However, as shown herein, the length of the downcomer outlet 122 and corresponding tray inlet area 138 of the tray 130, can vary significantly within the tray support ring region 137 of the tray 130 without having any affect on the availability of tray active area 131 inwardly of the tray support ring region 137.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A process column comprising:

a tower having at least one tray support ring mounted therein;

a tray supported on the tray support ring within said tower, said tray having a tray support region directly above the location where the tray support ring engages said tray; and a downcomer having a semi-circular outlet for the flow of liquid therefrom, said semi-circular outlet having a substantially semi-circular inner wall and being disposed substantially above, and directed substantially towards the tray support region of said tray, said downcomer having a semi-conical wall that tapers to the substantially semi-circular inner wall of the semi-circular outlet.

2. The process column as set forth in claim 1, wherein said tray includes a tray inlet area where liquid from said downcomer is to engage said tray and an inlet weir disposed on an upper surface of said tray enclosing the tray inlet area.

3. The process column as set forth in claim 2, wherein the inlet weir of said tray includes a top edge and wherein the semi-circular outlet of said downcomer is positioned below the top edge of the inlet weir of said tray.

4. The process column as set forth in claim 2, wherein said tray includes an active area and at least one venting chamber for the passage of vapor such that said vapor exerts a force against liquid from the inlet weir across the active area.

5. The process column as set forth in claim 1, further including an upper tray having an outlet weir, said upper tray being positioned such that fluid passing over the outlet weir flows into the downcomer.

6. The process column as set forth in claim 5, wherein the outlet weir of said upper tray is a chordal outlet weir.

7. The process column as set forth in claim 5, wherein the outlet weir of said upper tray is a multi-sectioned outlet weir.

8. The process column as set forth in claim 5, wherein the outlet weir of said upper tray is an arcuate outlet weir.

9. The process column as set forth in claim 8, wherein the arcuate outlet weir is a semi-circular outlet weir.

10. The process column as set forth in claim 5, wherein said tray includes a tray inlet area where liquid from said downcomer is to engage said tray and an inlet weir disposed on an upper surface of said tray enclosing the tray inlet area.

11. The process column as set forth in claim 10, wherein the inlet weir of said tray includes a top edge and wherein the semi-circular outlet of said downcomer is positioned below the top edge of the inlet weir of said tray.

12. The process column as set forth in claim 10, wherein said tray includes an active area and at least one venting chamber for the passage of vapor such that said vapor exerts a force against liquid from the inlet weir across the active area.

13. A method of forming a chemical process tower comprising the steps of:

mounting a tray support ring within the chemical process tower;

forming a tray;

supporting the tray on the tray support ring in the chemical process tower with a tray support region of the tray directly above the tray support ring;

forming a downcomer with a semi-circular downcomer outlet having a substantially semi-circular inner wall and with a semi-conical wall that tapers to the substantially semi-circular inner wall of the semi-circular downcomer outlet; and positioning the semi-circular downcomer outlet substantially over the tray support region and directing the semi-circular downcomer outlet substantially towards the tray support region to define a tray inlet area of the tray substantially within the tray support region.

14. The method as set forth in claim 13, further including the step of forming an inlet weir on the tray enclosing the tray inlet area.

15. The method as set forth in claim 14, wherein the step of forming the inlet weir includes forming the inlet weir with a top edge, and wherein the step of positioning the semi-circular downcomer outlet includes positioning the semi-circular downcomer outlet below the top edge of the inlet weir on the tray.

16. The method as set forth in claim 14, wherein the step of forming the inlet weir includes forming the inlet weir with a top edge above the semi-circular downcomer outlet.

17. The method as set forth in claim 14, wherein the step of forming the tray includes forming the tray with an active area, and further including the step of forming at least one vent chamber on the tray for the passage of vapor such that the vapor exerts a force against liquid from the inlet weir across the active area of the tray.

18. The method as set forth in claim 13, further including the steps of:

forming an upper tray with an outlet weir; and positioning the upper tray such that fluid passing over the outlet weir flows into the downcomer.

19. The method as set forth in claim 18, wherein the step of forming the upper tray includes forming the upper tray with the outlet weir having a chordal shape.

20. The method as set forth in claim 18, wherein the step of forming the upper tray includes forming the upper tray with the outlet weir having a multi-chordal shape.

21. The method as set forth in claim 18, wherein the step of forming the upper tray includes forming the upper tray with the outlet weir having an arcuate shape.

22. The method as set forth in claim 21, wherein the arcuate shape of the outlet weir is semi-circular.

23. The method as set forth in claim 18, further including the step of forming an inlet weir on the tray enclosing the tray inlet area.

24. The method as set forth in claim 23, wherein the step of forming the inlet weir includes forming the inlet weir with a top edge, and wherein the step of positioning the semi-circular downcomer outlet includes positioning the semi-circular downcomer outlet below the top edge of the inlet weir on the tray.

25. The method as set forth in claim 23, wherein the step of forming the inlet weir includes forming the inlet weir with a top edge above the semi-circular downcomer outlet.

26. The method as set forth in claim 23, wherein the step of forming the tray includes forming the tray with an active area, and further including the step of forming at least one vent chamber on the tray for the passage of vapor such that the vapor exerts a force against liquid from the inlet weir across the active area of the tray.

* * * * *